United States Patent

[11] 3,592,958

[72] Inventor Paul S. Munn
    Boxford, Mass.
[21] Appl. No. 647,140
[22] Filed June 19, 1967
[45] Patented July 13, 1971
[73] Assignee Simplex Wire and Cable Company
    Cambridge, Mass.
    Continuation-in-part of application Ser. No.
    629,155, Apr. 7, 1967, now abandoned.

[54] ARMORED-AND-JACKETED SUBMARINE CABLE SPLICES AND METHOD OF PREPARING SUCH SPLICES
29 Claims, 8 Drawing Figs.

[52] U.S. Cl. .................................................. 174/88,
                                                29/628, 156/49
[51] Int. Cl. ...................................................... H02g 15/08
[50] Field of Search............................................ 174/70.1,
    77, 76, 84, 88, 89, 90, 91, 92, 21; 29/624, 628, 630
    F; 156/49

[56] References Cited
UNITED STATES PATENTS

| | | | |
|---|---|---|---|
| 1,647,699 | 11/1927 | Hoeftmann.................. | 174/88 X |
| 2,536,173 | 1/1951 | Hamilton..................... | 174/88 X |
| 2,429,889 | 10/1947 | Morrison..................... | 174/91 X |
| 2,435,284 | 2/1948 | Lodge ........................ | 174/84 |
| 2,913,514 | 11/1959 | Short............................ | 174/88 X |
| 3,134,843 | 5/1964 | Monelli ...................... | 174/88 |

Primary Examiner—Darrell L. Clay
Attorney—McLean, Morton and Boustead

ABSTRACT: A splicing technique for connecting armored-and-jacketed cables is described. The method is particularly useful in regard to submarine cable. Single- and double-armored cables, which may or may not be caged, are spliced in such a manner as to restore the splice to the strength of the original cable. The splice itself consists of several splice positions, and the wires and splice areas are completely embedded in a rubberlike material before the outer jacket is restored.

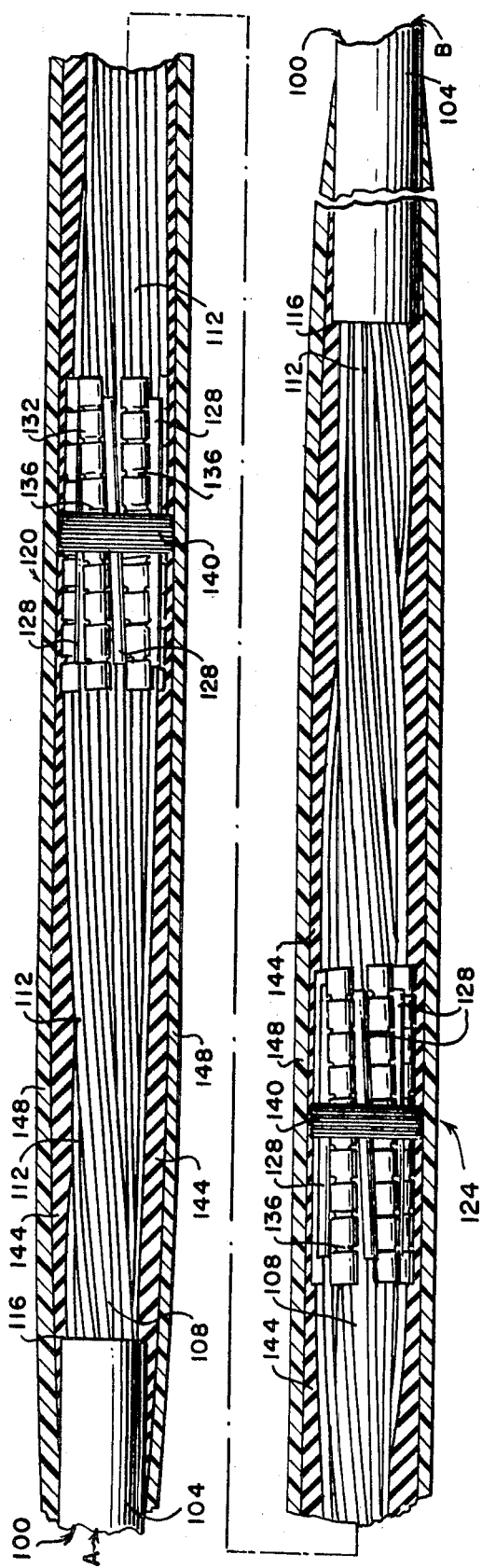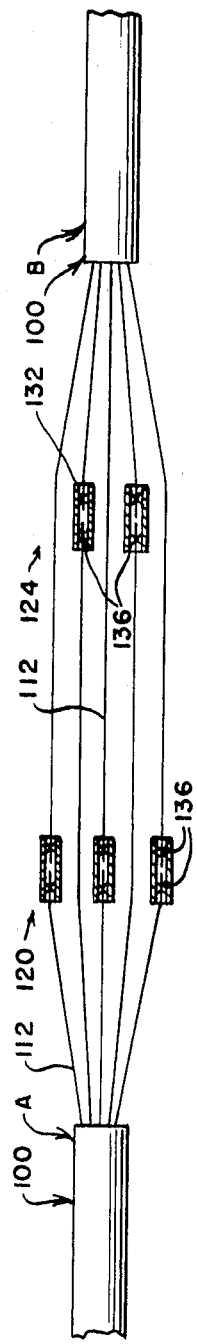

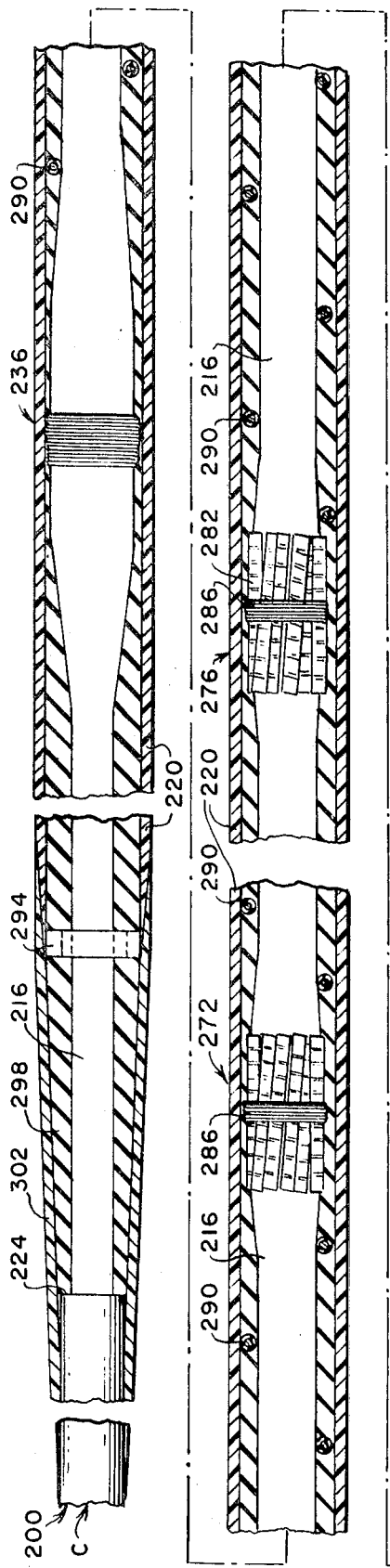
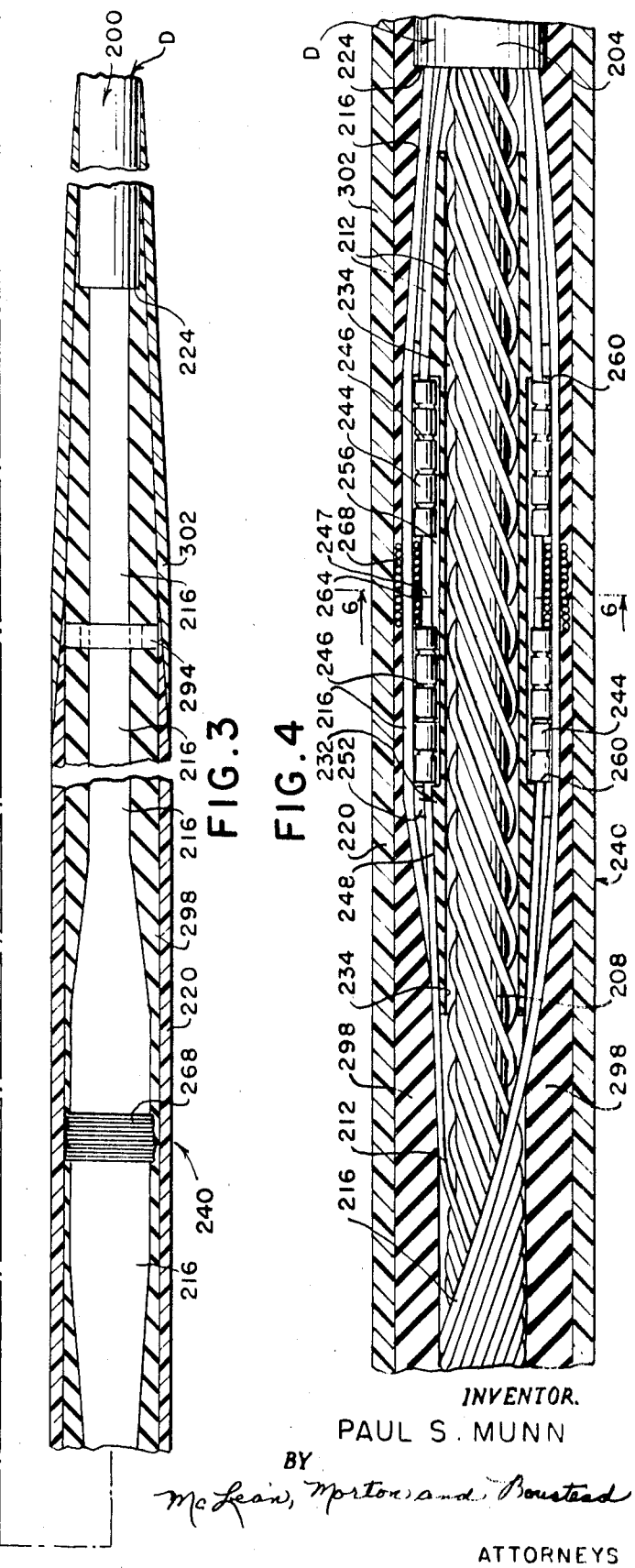
FIG. 3
FIG. 4
INVENTOR.
PAUL S. MUNN
BY
McLean, Morton and Boustead
ATTORNEYS

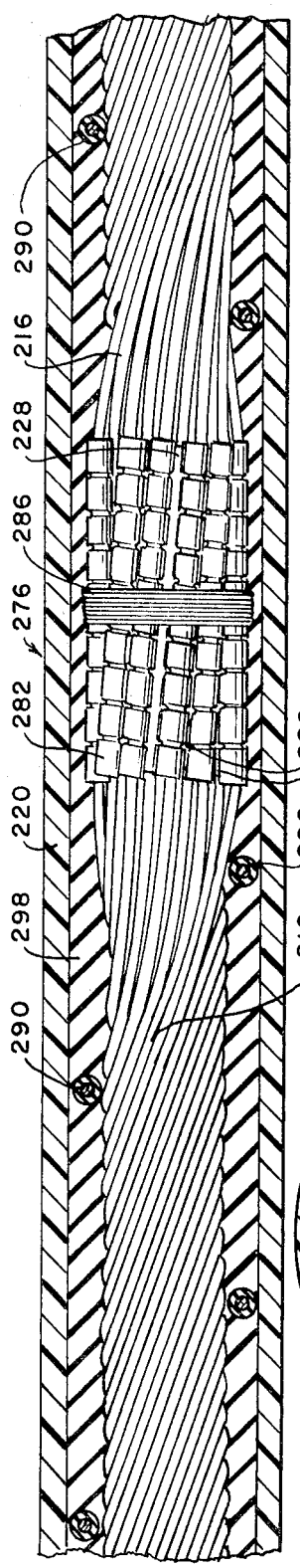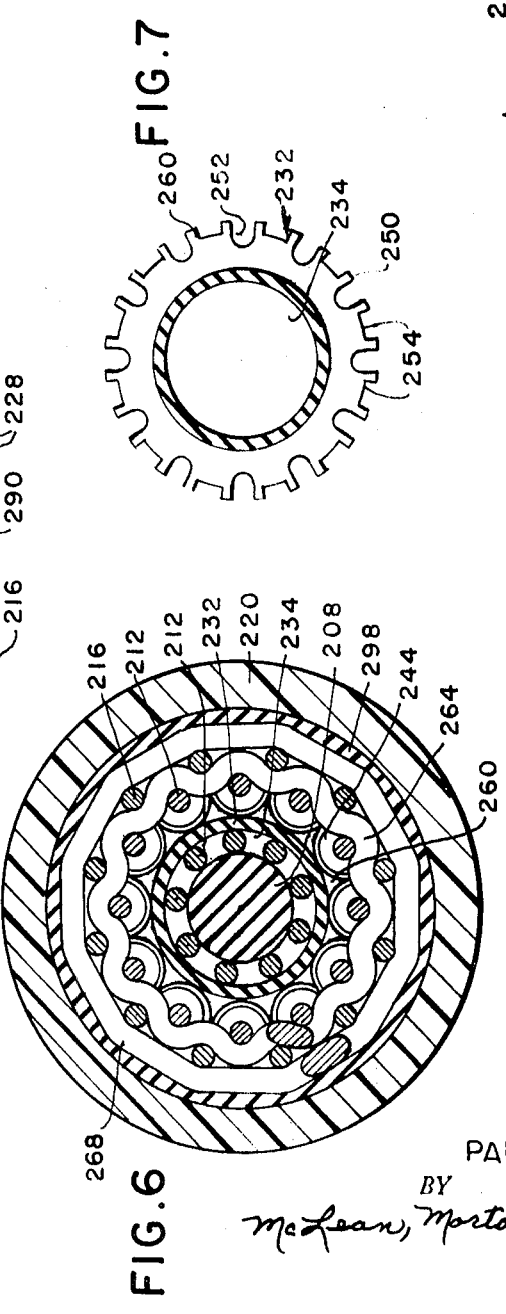
INVENTOR.
PAUL S. MUNN
BY
McLean, Morton and Boustead
ATTORNEYS

ARMORED-AND-JACKETED SUBMARINE CABLE SPLICES AND METHOD OF PREPARING SUCH SPLICES

CROSS-REFERENCE TO RELATED APPLICATION

This application is a continuation-in-part of my pending application, Ser. No. 629,155, filed Apr. 7, 1967, now abandoned.

BACKGROUND OF THE INVENTION

1. Field of the Invention

This invention relates to splices in cables and particularly to splices in armored and jacketed submarine cables. This invention also relates to methods of producing such splices.

2. Description of the Prior Art

A caged-armored and jacketed type of submarine cable has recently been developed which substantially differs from conventional armored cables. The caged-armored and jacketed submarine cable is constructed by having the armor wires (which are spaced apart) served simultaneously with, and embedded in, the outer jacket of thermoplastic or other suitable material. This mode of construction of the strength member of the submarine cable provides a cable with great strength, lower cost, smaller size, and superior protection to the strength member from abrasion and corrosion. The splicing of the caged-armored and jacketed submarine cable presents several problems, some of which are not encountered in the splicing of conventional armored cables. There is the need of restoring a continuous jacket over the splice area without including voids within the splice area to prevent jacket collapse under hydrostatic pressure.

The conventional overlaid-type armor splice normally has a length of 25 feet or longer which causes extreme difficulty in obtaining jacket restorations which meet the above requirement. Shorter sleeved armor splices, of the conventional type, complicate jacket restoration because of an irregular diameter. There is also the need of achieving a uniform tension balance between the several armor wires so that the splice has a strength approximating that of the original cable. Any splice must also retain sufficient flexibility and limit any diameter changes in order to provide satisfactory handling capabilities.

SUMMARY OF THE INVENTION

This invention broadly is a cable splice between two elongated cable sections where each cable section includes an elongated core member; one or more separate layers, each separate layer being comprised of a plurality of elongated strength members concentrically arranged around the core member; and an outer jacket of thermoplastic or other suitable material. The splice is comprised of:

a. The elongated core members of the two cable sections attached mechanically to each other in an abutting position;

b. the plurality of elongated strength members of each separate layer of one of the cable sections terminated at least at two different positions along the length of the cable section and attached mechanically to the corresponding elongated strength members of each separate layer of the other cable section which have been terminated at the same positions to accomplish the matings, where the outer jacket of each cable section has been removed back to a suitable position, whereby there is sufficient space to splice one cable section to the other;

c. an elastomeric substance embedded around the elongated strength members and the various attachment positions; and d. a continuous outer coating covering the entire area of the cables from which the outer jacket has been removed.

The broad concept of this invention envisions the splicing of caged and noncaged armored and jacketed cable, and the splicing of such cable having one or more layers of armor wires. The term caged means that one or more of the layers of armor wires are embedded in the inside portion of the outer jacket of the cable. In more specific embodiments, the elongated strength members are helically served around the core members. The cable spliced according to this invention is normally and preferably submarine cable.

This invention includes the broad method of splicing together two cable sections, where each cable section includes an elongated core member; one or more separate layers, each separate layer being comprised of a plurality of elongated strength members concentrically arranged around the core member; and an outer jacket of thermoplastic or other suitable material, which comprises:

a. removing the outer jacket of each cable section back to a suitable position whereby there is sufficient space to splice one cable section to the other;

b. attaching the elongated core members mechanically to each other in an abutting position;

c. terminating the elongated strength members of each separate layer of one of the cable sections at least at two different positions and terminating the corresponding elongated strength members of each separate layer of the other cable section at the proper positions to accomplish the matings;

d. attaching the ends of the mating elongated strength members mechanically to each other;

e. embedding the elongated strength members and the various splicing positions within an elastomeric substance prior to application of tensile load; and f. placing a continuous outer coating over the entire area of the cable sections from which the outer jacket has been removed.

A narrower embodiment of this invention is a cable splice of two elongated cable sections where each cable has one layer of elongated strength members concentrically arranged around the core member, which is embedded in the inside portion of the outer jacket. The splice itself comprises the elongated core members of the two cable sections attached mechanically to each other in an abutting position; the plurality of elongated strength members of one of the cable sections terminated at least at two different positions along the length of the cable section and attached mechanically to the corresponding elongated strength members of the other cable section which have been terminated at the same positions to accomplish the matings, where the outer jacket has been removed from the elongated strength members of each cable section back to a suitable position; an elastomeric substance embedded around the elongated strength members and the various attachment positions; and a continuous outer coating covering the entire area of the cables from which the outer jacket has been removed. The splice area of this particular embodiment is described in detail in the following detailed description of the drawings. The armor wires are terminated at several splicing positions and preferably are attached to each other by means of crimped sleeves that fit over the ends of the individual wires. At each splice position, the armor wires can be bound tightly together by means of a binder wire into a bundle that includes the crimped sleeves. An elastomeric substance that preferably vulcanizes at room temperature, such as, a polysulfide rubber compound, is placed around the bared armor wires and the splices so that the wires, etc. are embedded in the substance while under no load. This causes even a slack wire in the splice area to carry its load of any tension subsequently applied to the spliced cable and helps to prevent void spaces containing entrapped air. Preferably the embedded substance is applied utilizing a mold which places a taper at each end that extends onto the surface of the original unstripped cable sections. A continuous outer coating can be placed around the entire encapsulated area by helically wrapping conventional jacket tape around it and then fusing the tape by means of heat.

The method of splicing the two elongated cable sections of the immediately foregoing narrow embodiment of this invention comprises: removing the outer jacket of each cable section back to a suitable position whereby there is sufficient space to splice one cable section to the other; attaching the elongated core members mechanically to each other in an abutting position; terminating the plurality of elongated strength members of one of the cable sections at least at two different positions along the length of the cable section and terminating the corresponding elongated strength members of the other cable section at the proper positions to accomplish the matings; attaching the ends of the mating elongated strength members mechanically to each other; embedding the elongated strength members and the various splicing positions within an elastomeric substance prior to application of tensile load; and placing a continuous outer coating covering the entire area of the cable sections from which the outer jacket has been removed. The sequence of several of the steps in the above-described method of splicing is not crucial and can be interchanged, as one skilled in the art will realize.

Another narrow embodiment of this invention is a cable splice between two elongated noncaged cable sections where each cable section includes two separate layers of elongated strength members concentrically arranged around the core member. The splice itself comprises: the elongated core members of the two cable sections attached mechanically in an abutting position; the outer layer of elongated strength members of one of the cable sections terminated at least at two different positions along the length of the cable section and attached mechanically to the corresponding outer elongated strength members of the other cable section which have been terminated at the proper positions to accomplish the matings, where the outer jacket has been removed from each cable section back to a suitable position; a plurality of housings which are traversed longitudinally by an internal passageway through which the elongated core member passes and which is positioned inside of the outer layer of elongated strength members; the inner layer of elongated strength members of one of the cable sections terminated at least at two different positions along the length of the cable section, the number of which positions equals the number of housings used, and mechanically attached to the housings that are positioned for the strength members having that particular length, and the inner layer of elongated strength members of the other cable section terminated at the proper positions to accomplish the matings by attachment to the corresponding housings, where those inner elongated strength members which are not attached to a particular housing pass through the internal passageway of the particular housing; an elastomeric substance embedded around the elongated strength members and the housings; and a continuous outer coating covering the entire area of the cable sections from which the outer jacket has been removed. The outer layer of armor wires is spliced in the manner set forth above for splicing the caged and single-armored cable. The inner armor wires are terminated in part at a number of positions along the length of the cable and are attached to housings which help take up any tensional load. Preferably, each housing is inwardly tapered at those portions near the openings of the internal passageway; has an annular recess that traverses it in a direction that is generally perpendicular to the internal passageway; has annular ridges that lie between the annular recess and the tapered positions; and has a plurality of external grooves extending through the annular ridges that are generally parallel to the internal passageway, wherein corresponding inner armor wires are attached to the housing by means of a sleeve affixed near the end of the sleeve members which fit into the annular recess when the particular inner armor wires are placed in the external grooves of the housing. The inner armor wires have crimped sleeves on the end of each wire, which are placed in the annular recess of the appropriate housing in a manner so that the wires fit into the grooves. The other inner wires that have not been terminated at that position and the center core pass through the hole in the center of the housing. The outer armor wires pass outside of the housing, and like the spliced inner wires, can be bound to the bundle by means of a binder wire wrapped around the housing. The preferred manner of placing a continuous coating around the encapsulated area is described in the following detailed description of the drawings.

The method of splicing the two elongated, noncaged cable sections of the immediately foregoing narrow embodiment of this invention comprises: removing the continuous outer coating of each cable section back to a suitable position whereby there is sufficient space to splice one cable section to the other; attaching the elongated core members mechanically to each other in an abutting position; terminating the inner plurality of elongated strength members of one of the cable sections at least at two different positions along the length of the cable section and terminating the inner plurality of elongated strength members of the other cable section at the proper positions to accomplish the matings; positioning a housing at each termination position of the inner strength members, which is traversed longitudinally by an internal passageway through which the elongated core member and the remainder of the inner strength members are passed; attaching the ends of the mating inner elongated strength members to the appropriate housing; terminating the outer plurality of elongated strength members of one of the cable sections at least at two different positions along the length of the cable section and terminating the corresponding outer elongated strength members of the other cable section at the proper positions to accomplish the matings; attaching the ends of the mating outer elongated strength members mechanically to each other so that the outer strength members are positioned concentrically outside of the housings; embedding an elastomeric substance around the inner and outer elongated strength members and the housings prior to application of tensile load to the spliced cable; and placing a continuous outer coating over the entire area of the cable sections from which the outer jacket has been removed. The sequence of several of the steps in the above-described method of splicing is not crucial and can be interchanged.

BRIEF DESCRIPTION OF THE DRAWINGS

A more complete understanding of the basic principles of this invention can be obtained from the appended drawings in which:

FIG. 1 is a view of a splice between two caged-single-armored and Jacketed cable sections with substantial portions broken away and with the splice segmented into two portions for convenience;

FIG. 2 is a partial diagrammatic representation of the splice of the layer of armor wires of the cable sections shown in FIG. 1;

FIG. 3 is a view of a splice between double-armored and jacketed cable sections (noncaged), with substantial parts broken away and with the splice segmented into three portions for convenience;

FIG. 4 is a longitudinal cross section at one splicing position of the inner armor wires of the cable sections shown in FIG. 3;

FIG. 5 is a longitudinal cross section at one splicing position of the outer armor wires of the cable sections shown in FIG. 3;

FIG. 6 is a transverse cross-sectional view taken on line 6–6 in FIG. 4, looking in the direction of the arrows;

FIG. 7 is a transverse cross-sectional view of the terminating sleeve housing taken on line 7–7 in FIG. 8, looking in the direction of the arrows; and FIG. 8 is a side elevation view of terminating sleeve housing, with some portions broken away.

DETAILED DESCRIPTION OF THE DRAWINGS

Referring to FIG. 1, which illustrates the preferred embodiment of the splicing of the single-armored cable, the numeral 100 represents a caged-single-armored and jacketed cable which is comprised of outer jacket or coating 104, core 108 which typically includes a central conductor and layer of solid dielectric applied about such conductor. A plurality of armor wires 112 are helically served, spaced apart, around core 108.

Outer jacket 104 can be a thermoplastic or other suitable substance. Armor wires 112 are represented as circular wires, but they can take any shape, for example, rectangular, etc., can be single or stranded wires, can be coated or uncoated, and can be present in any convenient number to form what is essentially a layer. Core 108 can include a single conductor or a composite structure including several separating insulated conductors, but should be flexible enough so that it can be used as a submarine cable.

In FIG. 1, outer jacket 104 has been stripped away from armor wires 112 at the end of each of cable sections A and B by any convenient method. Outer jacket 104 has been stripped back to point 116 on both cable sections A and B, which is about 14 inches from the end of each cable. About half of armor wires 112 of each cable section are terminated at a position about 6 inches from point 116. When cable sections A and B are placed end to end, half of armor wires 112 of each cable section mate with half of armor wires 112 of the other cable section in each of the positions indicated at 120 and 124. Position 120 lies about 6 inches from point 116 on cable section A and position 124 lies about 6 inches from point 116 on cable section B. Core 108 of each cable section is terminated about 10 inches from point 116, and then they are abutted together and attached mechanically and electrically in any convenient manner. The shorter armor wires 112 of cable section A are individually mated with the longer armor wires 112 of cable section B by means of sleeves 132. Sleeves 132 are crimped in a multitude of places 136 to ensure good attachment. The shorter armor wires 112 of cable section B and the longer armor wires 112 of cable section A are similarly mated and attached to each other. Armor wires 112 could be collectively or individually electrically connected to each other, if desired. Crimped sleeves 132 are separated with spacer rods 128 and are bound tightly into bundles at points 120 and 124 with binder wires 140. The entire splice is then placed in a removable mold, an elastomer-forming substance 144 in the liquid state is poured into the mold, and cured while no tensile load is applied to the spliced cable, thereby encapsulating wires 112 and the bound bundles at positions 120 and 124. Substance 144 preferably vulcanizes at room temperature to form a rubbery solid, such as a polysulfide rubber, but other materials such as polyurethanes, silicones, etc., can be used. Substance 144 fills the void areas around sleeves 132, spacer rods 128, and armor wires 112, and provides a smooth regular contour around the splice areas and wires. Substance 144 improves the tension balance of wires 112 that is needed if the strength of the splice is to closely approach that of the original cable. However careful the splicing technique may be, there is invariably some slack or looseness in some of the individually spliced armor wires 112, which of course means that these wires will not carry their appropriate share of the load when tension is applied to spliced cable 100. By placing and curing substance 144 around and over armor wires 112 and sleeves 132, each individual wire 112 with its corresponding splice is forced to take up a portional share of any tensile load that is applied to the cable. Once encapsulation of the spliced areas has been completed, outer coating 104 is restored by a conventional hand-applied wrapping of a jacket tape 148, such as polyethylene tape. Jacket tape 148 is normally applied in a helical manner around the encapsulated area and beyond points 116 on cable sections A and B. The strands of jacket tape 148 are fused together by the external application of heat to form an integral and continuous outer coating. Layers of glass fiber and/or pressure-sensitive polyester tape can be included between rubberlike material 144 and outer jacket 148 to provide a partial heat and vapor barrier.

The novel splicing technique of this invention, when using the submarine cable shown in FIG. 1, produces a splice that has an overall length of about 3 feet, whereas the use of the conventional overlaid-type armor splice would produce a splice that has an overall length of about 25 feet. The novel splice also has about 100 percent of the original strength of the original cable.

Armor wires 112 can be divided into other than two groups, for example, three, four, etc., with each group terminated at different positions along the bared portion of cable segment A. With the same done to cable segment B, the corresponding groups of armor wires 112 can be paired off wire by wire so that a splice may be obtained at each group location, thereby producing a plurality of splice locations. The disadvantage of using more than two splice locations is that the overall length of the total splice is increased.

A partial diagrammatic representation of the splices at positions 120 and 124 is shown in FIG. 2 wherein crimped sleeves 132 are illustrated as broken away. FIG. 2 readily shows how half the wires 112 of both cable sections A and B are terminated at each of positions 120 and 124 and then spliced by means of crimped sleeves 132.

Referring to FIG. 3, which illustrates the preferred embodiment of the splicing of a double-armor cable, the numeral 200 represents a double-armored and jacketed submarine cable, that is not caged. As best shown in FIGS. 4 and 6, cable 200 is comprised of core 208, a layer of armor wires 212 helically wrapped around core 208, another layer of armor wires 216 helically wrapped around armor wires 212, and outer jacket 204. Outer jacket 204 preferably consists of a thermoplastic substance, but can be made of any other suitable material. Armor wires 212 and 216 being helically wound, form what might be collectively termed elongated strength members 212 and 216. Core wire 208 is also termed elongated core member 208.

A polyethylene pipe 220 is slipped over one of cable sections C and D to a position outside of the splice area. Pipe 220 can be made of a thermoplastic or any other suitable material, but should be of the same material as the original cable jacket. In FIG. 3, outer jacket 204 has been stripped away from the end of each of cable sections C and D. Outer jacket 204 has been stripped back to point 224 on both cable sections C and D, which is about 54.5 inches from the end of each cable section. About one-half of armor wires 216 of each cable section are cutoff at a position about 29 inches from point 224, and the other one-half of armor wires of each cable section are cutoff at a position about 41 inches from point 224. Armor wires 216 are spread back out of the way. About one-half of armor wires 212 of each cable section are cutoff at a position about 15.5 inches from point 224, and then spread back out of the way.

Terminating sleeve housing 232 has a longitudinally oriented passageway 234 that traverses its entire length (see FIG. 8). Terminating sleeve housing 232 is slipped over core 208 and the remaining portion of armor wires 212 of cable section C, and then another is similarly slipped over cable section D. The remaining portion of armor wires 212 of each cable section is unraveled and folded back out of the way. Core 208 of each cable section is terminated about 35 inches from point 224, abutted together, and attached mechanically and electrically in any convenient manner. Terminating sleeve housings 232 are slipped into position at position 236 (about 15.5 inches from point 224 on cable section C) and position 240 (about 15.5 inches from point 224 on cable section D).

As best shown in FIG. 4, termination sleeves 244 are placed on the overlapping ends 247 of every pair of armored wires 212 to be joined, with a part of each wire 212 extending a few tenths of an inch or so through its associated terminating sleeve 244, and then crimped (see numerals 246). Each termination sleeve housing 232 is tapered on both ends 248 and has ridges 250 inside of tapered ends 248. Ridges 250 are traversed longitudinally by a series of deeper grooves 252 and shallower grooves 254 (which are best illustrated in FIGS. 7 and 8). An annular recess 256 traverses each housing 232 around its entire central portion. Grooves 252 and 254 in ridges 250 have openings on lips 260 of annular recess 256, as shown in FIG. 7. The ends of armor wires 212 are placed in the appropriate grooves 252 in terminating sleeve housing 232 so that termination sleeves 244 lie in annular recess 256, as shown in FIG. 4.

Before armor wires 212 are placed in annular recess 256, they are rewound in a helical manner until they reach terminating sleeve housing 232. The ends 247 of armor wires 212 should overlap slightly. That portion of armor wires 212 extending out beyond terminating sleeves 244 is bound tightly with binder wire 264 as shown in FIG. 4. Terminating sleeves 244 are drawn up against the lips 260 of annular recess 256 when tension is placed on cable 200. The tensile load on armor wires 212 is transmitted through the body of terminating sleeve housings 232.

Armor wires 216 of cable section C are helically wrapped around the inner armor wires 212 until the terminating sleeve housing 232 at position 236 is reached, are laid over housing 232 in a direction parallel to cable sections C and D, (utilizing shallow grooves 254 to hold the wires 216 in place), and then are helically wrapped for the rest of their lengths. Armor wires 216 of cable section D are similarly wrapped. Armor wires 216 are bound tightly with binder wires 268 at positions 236 and 240. Armor wires 216 are spliced at positions 272 and 276 by the method given in the discussion of FIGS. 1 and 2, utilizing crimped sleeves 282, spacer rods 228 and binder wires 286 (see FIG. 5).

Segments of helically shaped spacer rod 290 are placed around cable 200 between positions 236—272, 272—276, and 176—240. Polyethylene pipe 220 is slipped over the splice area encompassing positions 236, 272, 276, and 240. Thermoplastic collars 294 are placed at each end of pipe 220. Collar 294 is comprised of a split annular that fits very loosely around armor wires 216 but tightly within the end apertures of pipe 220. A small metal mold is placed at each end of pipe 220. Each is of a tapered shape ending a few inches beyond position 224 on that part of each of cable sections C and D which has not had the outer jacket stripped away. The cable is tensioned slightly in a sloping position. Elastomer bedding compound 298 is forced into the area around the wires and splices through a hole in the lower mold until it issues from a hole in the upper mold, filling pipe 220. After curing, the molds are removed. Thermoplastic tape 302 is then helically wound around the tapered encapsulated areas at the ends of pipe 220 and fused into a continuous coating by means of heat.

This type of splice eliminates the danger of void spaces and the problem of slack wires. The splice area is about 6 feet, but this is still much shorter than those made by the conventional splice methods. The splice area is flexible and has a small, generally regular diameter. The splice also has about 100 percent of the original strength of the original cable. The use of the polyethylene pipe eliminates the expense of a very long mold, and the time and cost of hand wrapping and fusing thermoplastic tapes the entire length of the jacket restoration.

Armor wires 212 of cable sections C and D can be divided into other than two groups with each group terminated at different positions along the bared portions of cable sections C and D, provided the proper mating of wires occurs so that the original strength of the armor wires can be restored. As explained in the discussion of FIGS. 1 and 2, armor wires 216 of cable sections C and D can similarly be divided into more than two groups with each group terminated at different lengths. The number of places that armor wires 216 are spliced does not have to be the same as the number of places that armor wires 212 are spliced. The sequence of the splice positions is not limited to that shown in FIG. 3.

FIG. 4 is a longitudinal cross-sectional view of one of the splice areas of armor wires 212. A similar longitudinal cross-sectional view of one of the splice areas of armor wires 216 is shown in FIG. 5. FIG. 6 is a transverse cross-sectional view of the splice area of armor wires 212 shown in FIG. 4. FIG. 7 illustrates a cross-sectional view of terminating sleeve housing 232 shown in FIG. 8. FIG. 8 is a side elevation view of termination sleeve housing 232.

What I claim is:

1. A splice between two elongated cable sections, where each cable section includes an elongated core member, one or more separate layers, each separate layer being comprised of a plurality of elongated strength members concentrically arranged around the core member, and an outer jacket of thermoplastic or other suitable material, comprised of:
   a. the elongated core members of the two cable sections attached mechanically to each other in an abutting position;
   b. the plurality of elongated strength members of each separate layer of one of the cable sections terminated at least at two different positions along the length of the cable section and attached mechanically to the corresponding elongated strength members of each separate layer of the other cable section which have been terminated at the same positions to accomplish the matings, where the outer jacket of each cable section has been removed back to a suitable position, whereby there is sufficient space to splice one cable section to the other;
   c. an elastomeric substance embedded around the elongated strength members and the various attachment positions; and
   d. a continuous outer coating distinct from said elastomeric substance covering the entire area of the cables from which the outer jacket has been removed.

2. The cable splice in claim 1 wherein each cable section includes one layer of elongated strength members.

3. The cable splice in claim 2 wherein the layer of elongated strength members is embedded in the inside portion of the outer jacket.

4. The cable splice in claim 3 wherein the core members are electrically connected.

5. The cable splice in claim 3 wherein the elongated strength members are electrically connected.

6. The cable splice in claim 3 wherein the elongated strength members are armor wires.

7. The cable splice in claim 6 wherein the armor wires of each cable section are helically wrapped around the core member.

8. The cable splice in claim 7 wherein the armor wires of each cable section terminate at two corresponding positions.

9. The cable splice in claim 8 wherein the armor wires of each cable section are attached to each other by means of crimped sleeves that fit over the ends of the individual armor wires.

10. The cable splice in claim 9 wherein each group of crimped sleeves is tightly bound together into a bundle by means of a binder wire.

11. The cable splice in claim 10 wherein the continuous outer coating extends onto the outer jacket of each cable section.

12. The cable splice in claim 11 wherein the ends of the continuous outer coating are tapered away from the splice area.

13. The cable splice in claim 12 wherein a plurality of layers of glass fiber and a plurality of layers of pressure-sensitive polyester tape are included between the elastomeric substance and the continuous outer layer.

14. The cable splice in claim 13 wherein the elastomeric substance is a polysulfide rubber compound.

15. The cable splice in claim 1 wherein each cable section includes two separate layers of elongated strength members.

16. The cable splice in claim 15 wherein there are at least two housings which are traversed longitudinally by an internal passageway and which are positioned on each cable section at each position of inner layer termination and inside of the outer layer of elongated strength members, and the terminations of said inner layer of elongated strength members being mechanically attached to the housings and those inner elongated strength members which are not attached to a particular housing pass through the internal passageway of that housing.

17. The cable splice in claim 16 wherein the core members are electrically connected.

18. The cable splice in claim 16 wherein the inner layer of elongated strength members is electrically connected.

19. The cable splice in claim 16 wherein the elongated strength members are armor wires.

20. The cable splice in claim 19 wherein the housings are inwardly tapered at those portions near the openings of the internal passageway, have an annular recess that traverses the housing in a direction that is generally perpendicular to the internal passageway, have annular ridges that lie between the annular recess and the tapered end portions, and have a plurality of external grooves extending through the annular ridges that are generally parallel to the internal passageway, wherein corresponding inner armor wires are attached to the housings by means of a sleeve affixed near the end of the sleeve members which fit into the annular recess when the particular inner armor wires are placed in the external grooves of the housings.

21. The cable splice in claim 20 wherein the sleeves attached near the end of each armor wire are attached by means of crimping.

22. The cable splice in claim 21 wherein the ends of the inner armor wires in the annular recess various housings are bound tightly into a bundle by means of a binder wire.

23. The cable splice in claim 22 wherein the outer armor wires are bound tightly around the various housings by means of a binder wire.

24. The cable splice in claim 23 wherein the armor wires of each cable section are helically wrapped around the core member.

25. The cable splice in claim 24 wherein the armor wires of each cable section terminate at two corresponding positions.

26. The cable splice in claim 25 wherein the continuous outer coating extends onto the thermoplastic jacket of each cable section.

27. The cable splice in claim 26 wherein the ends of the continuous outer coating are tapered away from the splice area.

28. The cable splice in claim 27 wherein the continuous outer coating consists of a polyethylene tube in the nontapered areas and of a heat-fused polyethylene wrapping in the tapered areas.

29. The method of splicing together two cable sections, where each cable section includes an elongated core member, one or more separate layers, each separate layer being comprised of a plurality of elongated strength members concentrically arranged around the core member, and an outer jacket of thermoplastic or other suitable material, which comprises:
   a. removing the outer jacket of each cable section back to a suitable position whereby there is sufficient space to splice one cable section to the other;
   b. attaching the elongated core members mechanically to each other in an abutting position;
   c. terminating the elongated strength members of each separate layer of one of the cable sections at least at two different positions and terminating the corresponding elongated strength members of each separate layer of the other cable section at the proper positions to accomplish the matings;
   d. attaching the ends of the mating elongated strength members mechanically to each other;
   e. embedding the elongated strength members and the various splicing positions within an elastomeric substance prior to application of tensile load; and then
   f. placing a continuous outer coating over the entire area of the cable sections from which the outer jacket has been removed.